United States Patent Office 3,119,856
Patented Jan. 28, 1964

3,119,856
PROCESS FOR THE PREPARATION OF TOLYLENE DIISOCYANATES
Robert M. Thomas, Orange, Conn., and Mason C. Blaich, Kenmore, N.Y., assignors to Olin Mathieson Chemical Corporation, a corporation of Virginia
No Drawing. Filed Mar. 28, 1961, Ser. No. 98,754
6 Claims. (Cl. 260—453)

The present invention relates to a process for the preparation of organic isocyanates. More particularly, the present invention resides in a process for the preparation of organic isocyanates by the phosgenation of the corresponding amine hydrochloride in an inert organic ester medium and at an elevated temperature.

The organic isocyanates, especially tolylene diisocyanate and mixtures of isomers thereof, are valuable commercial products. They are useful for a wide variety of purposes, among which are as intermediates for the preparation of adhesives, cross linking agents in the preparation of plastic materials, and starting materials in the preparation of polyurethane resins. Numerous methods have been proposed for the preparation of organic isocyanates. These methods are, however, subject to one or more significant disadvantages, such as low yields, slow reaction, complex procedures, hazardous reaction conditions and the production of significant amounts of by-products.

The organic isocyanates are conventionally prepared by the addition of excess phosgene to a solution of the corresponding amine in an inert organic solvent at a temperature of from about 0° C. to room temperature. The resultant product is a mixture of the carbamyl chloride, the amine hydrochloride and some isocyanate. This reaction mixture is then phosgenated at temperatures high enough to convert the intermediate to the isocyanate, generally in the range of 160 to 210° C. This two-step process has the disadvantage of being slow and requiring careful temperature control to avoid side reactions, for example, the isocyanate and the intermediate carbamyl chloride which are formed may react with some of the starting amine to give substituted ureas and polyureas, thus decreasing the yield of isocyanate product. Furthermore, the high temperatures required for the conversion of the carbamyl chloride to the isocyanate represents a significant disadvantage in that these temperatures favor the polymerization of the isocyanate product.

To overcome these disadvantages it has been proposed that the phosgenation step be conducted at superatmospheric pressures. This effectively reduces the reaction time, but there is a considerable danger in holding phosgene under pressure at high temperatures.

Another method for the preparation of organic isocyanates is to react phosgene with the corresponding amine hydrochloride at a temperature of about 150° C., with the hydrochloride starting material being suspended in an inert diluent, such as ortho-dichlorobenzene or xylene. This method suffers from the disadvantage of low yields, product polymerization and resinous residues remaining in the still upon distillation of the diluent and isocyanate formed.

It is, therefore, an object of the present invention to provide a simple and expeditious process for the preparation of organic isocyanates, especially tolylene diisocyanate and mixtures of isomers thereof.

It is a further object of the present invention to provide a process for the preparation of organic isocyanates in high yields and without the formation of significant quantities of by-products.

It is a still further object of the present invention to provide a process for the preparation of organic isocyanates which does not require excessive reaction temperatures and excessive reaction times, and which does not utilize hazardous operating conditions.

Additional objects and advantages of the present invention will appear hereinafter.

It has now been found that the foregoing objects and advantages of the present invention may be accomplished by reacting an organic amine hydrochloride with a stoichiometric excess of phosgene in certain inert organic esters as a reaction medium at a temperature of between about 90 and 160° C. and recovering the resultant organic isocyanate product. More specifically, an organic isocyanate having the structural formula R—(NCO)$_n$, wherein $n$ is an integer from 1 to 2, and wherein R is a radical selected from the group consisting of saturated aliphatic, cycloaliphatic and aromatic, may be prepared by reacting an organic amine hydrochloride having the structural formula R—(NH$_2$Cl)$_n$, wherein $n$ and R are as defined above, with a stoichiometric excess of phosgene in an inert organic ester medium, said ester having the structural formula R'—COOR", wherein R' is selected from the group consisting of hydrogen and an alkyl group containing from 1 to 3 carbon atoms, and wherein R" is selected from the group consisting of an alkyl group containing from 2 to 7 carbon atoms and a cycloalkyl group, and wherein said ester contains a total of from 6 to 8 carbon atoms, at a temperature of between about 90 and 160° C., and recovering the resultant organic isocyanate product. An additional advantage may be obtained by preparing the organic isocyanate product directly from the corresponding organic amine utilizing the same ester medium defined above. In this procedure an organic amine having the structural formula R—(NH$_2$)$_n$, wherein $n$ and R are as defined above, is dissolved in the ester, converted to the hydrochloride by introducing a stoichiometric excess of anhydrous hydrogen chloride and then phosgenated as above. A still further advantage of the present invention may be obtained by preparing the organic isocyanate product directly from the corresponding organic nitro compound utilizing the same ester medium defined above, the organic nitro compound having the structural formula R—(NO$_2$)$_n$, wherein $n$ and R are as defined above. In this procedure, the organic amine is first prepared by hydrogenating the organic nitro compound dissolved in the ester in the presence of a hydrogenation catalyst. The organic amine product is then converted to the hydrochloride and phosgenated as above.

Typical amine hydrochlorides and resultant isocyanate products include, but are not limited to, the following: hexyl amine hydrochloride gives hexyl isocyanate; octyl amine hydrochloride gives octyl isocyanate; decyl amine hydrochloride gives decyl isocyanate; octadecyl amine hydrochloride gives octadecyl isocyanate; tetramethylenediamine dihydrochloride gives tetramethylene diisocyanate; pentamethylenediamine dihydrochloride gives pentamethylene diisocyanate; decamethylenediamine dihydrochloride gives decamethylene diisocyanate; cyclohexylamine hydrochloride gives cyclohexyl isocyanate; xylylene diamine hydrochlorides give xylylene diisocyanates; 4,4'-diaminodiphenylmethane dihydrochloride gives diphenylmethane, 4,4'-diisocyanate; 4,4'-diamino-β,β'-diphenylpropane dihydrochloride gives β,β'-diphenylpropane 4,4'-diisocyanate; benzylamine hydrochloride gives benzyl isocyanate; phenylethyl amine hydrochloride gives phenylethyl isocyanate; p-amino-benzylamine dihydrochloride gives p-isocyanato benzyl isocyanate; aniline hydrochloride gives phenyl isocyanate; p-dodecylaniline hydrochloride gives p-dodecylphenyl isocyanate; 5-dodecyl-o-toluidine hydrochloride gives 5-dodecyl-2-methylphenyl isocyanate; meta-phenylenediamine dihydrochloride gives meta-phenylene diisocyanate; 1-methyl phenylene-2,4-diamine dihydrochloride gives 1-methyl phenylene-2,4-diisocyanate; 1,4-naphthylenediamine dihydrochloride gives naphthylene 1,4-diisocyanate; toluenediamine dihydrochlorides give tolylene diisocyanates; and so forth. The preferred products of the present invention are the aromatic diisocyanates, especially tolylene diisocyanate and mixtures of isomers thereof, for example, commercially available mixtures of 2,4- and 2,6-tolylene diisocyanate. In the event the free amine or diamine is employed as starting material in accordance with the procedure outlined above, the free amine or diamine compound corresponding to the aforementioned hydrochloride or dihydrochloride compound is employed. In the event the nitro or dinitro compound is employed as starting material in accordance with the procedure outlined above, the nitro or dinitro compound corresponding to the aforementioned amine hydrochloride or diamine dihydrochloride is employed.

The esters which may be employed are saturated aliphatic and cycloaliphatic esters containing from 6 to 8 carbon atoms and having the structural formula given above. Generally, the esters which are employed have a boiling point in the range of from 105 to 180° C., and preferably from 115 to 150° C. Mixtures of esters satisfying the above requirements may also be advantageously employed. Typical esters which may be utilized include, but are not limited to, the following: n-amyl formate; isoamyl formate; n-hexyl formate; n-heptyl formate; n-butyl acetate; isobutyl acetate; isoamyl acetate; methyl amyl acetate; n-hexyl acetate; n-propyl propionate; n-butyl propionate; isobutyl propionate; n-amyl propionate; isoamyl propionate; n-ethyl butyrate; n-propyl butyrate; isopropyl butyrate; n-butyl butyrate; isobutyl butyrate; cyclohexyl formate; cyclohexyl acetate; cyclopentyl acetate; and so forth.

In the process of the present invention, the hydrochloride salt is slurried with the above solvent and the phosgene is introduced into the slurry until phosgenation is complete. The concentration of the amine hydrochloride salt in the ester may be varied within a wide range. Generally, up to one mole of the hydrochloride per liter of ester may be advantageously employed. This is an additional advantage of the process of the present invention, in that conventional processes generally cannot operate at such high concentrations. It is preferred to introduce the phosgene slowly over a period of time, while continuously agitating the reaction slurry. The process may be operated continuously with a portion of the reaction mixture being periodically withdrawn and the phosegene being continuously introduced. The withdrawn portion is then agitated until phosgene consumption has been completed.

As the reaction proceeds to completion, the exit gas contains decreasing proportions of anhydrous hydrogen chloride and increasing proportions of phosgene. In addition, as the reaction proceeds the slurry thins out and at the completion of the reaction all of the solid phase has disappeared.

The reaction temperature may be varied from about 90 to 160° C., and preferably 100 to 130° C. Reaction time will naturally vary depending upon the temperature employed, the concentration of the hydrochloride salt and the ester utilized. Generally, however, from 3 to 12 hours is adequate for complete phosgenation. Additional reaction times may be employed as desired, but may not necessarily have an advantageous effect, and in some cases may be accompanied by loss of yield.

The reaction product is a clear solution of isocyanate in the ester. The product may be recovered from the ester by known methods, such as vacuum distillation. The ester may, of course, be recycled in the process.

An additional advantage of the process of the present invention is that, if desired, the organic isocyanate product may be obtained directly from the corresponding free amine utilizing the same ester medium defined above. In this procedure the ester solution of the free amine is reacted with a stoichiometric excess of anhydrous hydrogen chloride at a temperature below about 100° C., preferably around 40° C., to form the hydrochloride salt. It is preferred to use a slight stoichiometric excess of anhydrous hydrogen chloride as greater amounts will be unconsumed. After the formation of the hydrochloride salt the phosgenation reaction is carried out as above. The free amine may be used in amounts up to one mole per liter of ester.

The phosgenation reaction must be conducted in the absence of water in order to avoid harmful side reactions and loss of yields. Even trace quantities of water can markedly reduce the product yield. If the reaction is conducted directly from the organic amine any water present may be removed prior to formation of the hydrochloride salt by azeotropic distillation of the water with the ester. This will leave behind organic amine of the desired concentration in the ester medium. Alternatively, the dihydrochloride salt may be filtered and dried to remove all water and ester. The desired amount of additional ester is then added and the phosgenation reaction conducted. Numerous other methods for removing the water will readily suggest themselves to those skilled in the art.

An additional and significant advantage of the present invention is that the organic isocyanates may be prepared directly from the corresponding organic nitro compounds utilizing the same ester medium throughout the process. When this procedure is employed the organic amine is first prepared by hydrogenating the organic nitro compound in the presence of a catalytic amount of a hydrogenation catalyst and in the aforementioned inert organic esters at a temperature of from about 15 to 150° C. and a pressure of from about 50 to 2000 pounds per square inch gauge. The catalyst is then separated, for example, by filtration, and the amine product in ester is converted to the hydrochloride and phosgenated as above.

In the hydrogenation reaction, it is preferred to introduce hydrogen into a pressurized reaction vessel containing the catalyst, ester and organic nitro compound. The reaction is continued until there is no further consumption of hydrogen. The time of reaction will naturally vary depending upon the pressure, temperature, and size of the run. From two to ten hours is normally sufficient for complete reaction. The hydrogenation reaction may be run continuously, if desired, by the use of methods known to the art. Preferably the reaction mixture is agitated by stirring, shaking or other suitable means in order to insure intimate contact between reactants and catalyst.

Typical catalysts which may be employed are nickel, a metal of the platinum metals group of the periodic system, and mixtures thereof. In addition, alloys of the foregoing metals may be employed. It is especially preferred to use Raney nickel, platinum or palladium. Any of the standard preparations of catalysts may be used. In the examples, which form a part of the present specification, the Raney nickel catalyst was prepared in the conventional manner by reaction of a 50 percent nickel, 50 percent aluminum alloy with caustic soda. The catalysts may be used alone or on a carrier, such as alumina or charcoal. The supported catalysts may be pelleted, granular or powdered. The catalyst may be on the outside of the support or throughout it. Normally, from 0.2 to 2 percent by weight of the metal of the platinum group is employed based on the organic nitro compound and from 20 to 65 percent by weight of nickel based on the organic nitro compound, and preferably from 35 to 50 percent by weight.

Temperatures of from about 15 to 150° C. are normally employed, and preferably 80 to 120° C. A pressure of from 50 to 2000 p.s.i.g. is normally employed. It is an advantage of the present invention that high yields of organic amine may be obtained in short reaction times and at relatively low reaction temperatures.

The concentration of the organic nitro compound in the solvent medium may be varied within a wide range. Generally, however, a 4 to 20 weight percent solution of organic nitro compound in the desired solvent is employed.

The use of the esters in the hydrogenation reaction affords numerous advantages over conventional methods for hydrogenating organic nitro compounds. Conventional procedures are frequently time consuming, involving recovery procedures which are expensive and complex in operation. In addition, conventional methods frequently obtain low yields. Still further, the solvents employed in art processes are not effectively utilizable in the subsequent conversion of the amine to the isocyanate. By employing the esters of the present invention in the hydrogenation reaction these disadvantages are overcome and also the esters of the present invention have slight water solubility, thus simplifying removal of water of reaction.

The following examples will further illustrate the process of the present invention and advantages derived therefrom.

EXAMPLE 1

A one liter, four-necked reaction flask was charged with 275 grams of a mixture containing about 80 percent 2,4- and about 20 percent 2,6-toluene diamine and 1,740 grams of isoamyl acetate. The mixture was brought to 80° C. and saturated with anhydrous hydrogen chloride gas to form a slurry of toluene diamine dihydrochloride in the ester. The temperature was then raised to a mild reflux (115° C.) and phosgene added at the rate of one gram per minute over a period of ten hours until a clear solution was obtained. During the phosgenation period, the temperature varied between about 115 and 130° C. The tolylene diisocyanate product (a mixture containing about 80 percent of the 2,4- and about 20 percent 2,6-isomer) was then recovered by vacuum fractionation at one to three millimeters mercury after the solvent had been stripped off at 10 to 15 millimeters of mercury. The 319 grams of product recovered has a refractive index at 25° C. of 1.5646, which represented a yield of 81.4 percent.

EXAMPLE 2

For comparison, in a manner after Example 1, 244 grams of a mixture containing about 80 percent 2,4- and about 20 percent 2,6-toluene diamine was converted to the dihydrochloride and phosgenated in 1,950 grams of o-dichlorobenzene at a temperature of between about 140 and 160° C. The phosgenation reaction was continued for about ten hours. Tolylene diisocyanate product (a mixture containing about 80 percent of the 2,4- and about 20 percent of the 2,6-isomer) was recovered in a yield of only 75.6 percent (263 grams) and had a refractive index at 25° C. of 1.5368. A portion of resinous residue was left in the still.

EXAMPLE 3

For comparison, into a closed, one liter flask was added 1,600 grams of o-dichlorobenzene and 881 grams of phosgene. The reaction flask was maintained at 7 to 15° C. and 326 grams of a mixture containing about 80 percent 2,4- and about 20 percent 2,6-toluene diamine dissolved in 600 grams of o-dichlorobenzene at 80° C. was added slowly over an eight hour period. Rapid agitation during this period was used to obtain a fine suspension and phosgene was continuously bubbled into the reaction mixture at the rate of one gram per minute. When the toluene diamine had been added, the temperature was brought slowly to 160° C. and held until a solution free of solids was obtained. Phosgene was bubbled in throughout this phase of the reaction at the rate of one gram per minute. This phase of the reaction took about eight hours. At the end of the reaction, the temperature was maintained at 100 to 120° C. for one hour as nitrogen was passed through at 50 to 70° C. per minute to degas the reaction mixture. Tolylene diisocyanate (a mixture containing about 80 percent of the 2,4- and about 20 percent of the 2,6-isomer) was then isolated by fractionation in the amount of 302 grams (only 65 percent yield) having a refractive index at 25° C. of 1.5654. A portion of resinous residue was left in the still.

EXAMPLE 4

A one liter, four-necked reaction flask was charged with 645 grams of n-butyl acetate and 92 grams of a mixture containing about 80 percent 2,4- and about 20 percent 2,6-toluene diamine. The mixture was then brought to 80° C. and saturated with anhydrous hydrogen chloride gas to form the dihydrochloride salt. The temperature was then raised to a mild reflux (115° C.) and phosgene added at the rate of one gram per minute over an eight hour period. During this time the temperature varied between about 90 and 120° C. The tolylene diisocyanate product (a mixture containing about 80 percent of the 2,4- and about 20 percent of the 2,6-isomer) was recovered in a manner after Example 1 in an amount of 48 grams, representing a yield of 91.4 percent, and having a refractive index of 1.5642.

EXAMPLE 5

A 7.6 percent by weight solution of purified dinitrotoluene (containing 81 percent 2,4-dinitrotoluene, 18.7 percent 2,6-dinitrotoluene and 0.3 percent other isomers) in n-butyl acetate was prepared by dissolving 131.5 grams of dinitrotoluene in 1800 milliliters of n-butyl acetate. The solution was placed in a one gallon autoclave containing 60 grams of Raney nickel catalyst. Hydrogen was continuously introduced into the autoclave over a period of 90 minutes through a pressure regulator which maintained a constant pressure of about 200 p.s.i.g. in the autoclave. The temperature of the reaction mixture was maintained at about 90° C. The reaction mixture was continuously agitated at 600 r.p.m. during the addition of hydrogen. After the hydrogen was introduced, the agitation was continued for an additional 4½ hours. After a total reaction time of 6 hours, the hydrogenation reaction was complete. The autoclave was then cooled and the clear ester solution of diamine was decanted from the catalyst. A small heel of solution containing suspended catalyst was left in the autoclave for reslurrying the catalyst for the next batch.

The procedure was substantially repeated for a total of 12 runs by adding fresh 7.6 percent by weight solution of dinitrotoluene in n-butyl acetate to the reactor each time. After run 8, the Raney nickel catalyst was removed and a fresh 60 gram batch was added. The average yield of diamine for the 12 runs was 97.5 percent based on dinitrotoluene charged.

The details of each run are summarized in the following table.

Table I

| Run No. | Total Reaction Time, Hr. | Pressure, p.s.i.g. | Temp., ° C. |
| --- | --- | --- | --- |
| 1 | 6.0 | 200 | 90 |
| 2 | 7.0 | 195 | 90 |
| 3 | 4.75 | 200 | 90 |
| 4 | 5.0 | 200 | 101 |
| 5 | 5.5 | 200 | 100 |
| 6 | 4.66 | 200 | 100 |
| 7 | 5.33 | 200 | 100 |
| 8 | 6.0 | 200 | 100 |
| 9 | 6.5 | 200 | 100 |
| 10 | 5.5 | 195 | 100 |
| 11 | 4.75 | 200 | 100 |
| 12 | 4.25 | 200 | 100 |

EXAMPLE 6

Example 5 was repeated for a total of 17 successive runs, summarized in the following table. In the following runs crude dinitrotoluene was employed containing 79.3 percent 2,4-dinitrotoluene, 17.3 percent 2,6-dinitrotoluene and 4.8 percent other isomers. The same catalyst from run 12 in Example 1 was employed. The catalyst was removed after run 8 and a fresh 60 gram batch was added. The average yield of diamine for the 17 runs was 96 percent based on dinitrotoluene charged.

Table II

| Run No. | Total Reaction Time, Hr. | Pressure, p.s.i.g. | Temp., °C. |
|---|---|---|---|
| 1 | 4.5 | 200 | 100 |
| 2 | 4.5 | 200 | 100 |
| 3 | 4.17 | 200 | 100 |
| 4 | 4.83 | 200 | 100 |
| 5 | 5.83 | 200 | 100 |
| 6 | 7.25 | 200 | 100 |
| 7 | 5.83 | 200 | 100 |
| 8 | 7.5 | 200 | 100 |
| 9 | 2.5 | 200 | 100 |
| 10 | 2.5 | 200 | 100 |
| 11 | 2.83 | 200 | 100 |
| 12 | 2.75 | 200 | 100 |
| 13 | 2.66 | 200 | 100 |
| 14 | 3.17 | 200 | 100 |
| 15 | 4.25 | 200 | 100 |
| 16 | 5.0 | 200 | 100 |
| 17 | 5.83 | 200 | 100 |

EXAMPLE 7

Dinitrotoluene, a mixture of isomers containing about 80 percent of the 2,4-isomer and 20 percent of the 2,6-isomer, was catalytically reduced in n-butyl acetate using Raney nickel as catalyst in a manner after Example 5. The Raney nickel catalyst was filtered off and the filtrate, containing the water of reduction, was saturated with dry hydrogen chloride to form the amine salt. The water was azeotroped off using excess n-butyl acetate and the reaction mixture phosgenated in a manner after Example 4. The resultant product, a mixture of about 80 percent 2,4- and 20 percent 2,6-tolylene diisocyanate was obtained in 84 percent yield based on dinitrotoluene charged.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:
1. A process for the preparation of tolylene diisocyanate which comprises reacting toluene diamine dihydrochloride with a stoichiometric excess of phosgene in an inert organic ester medium, said ester having the structural formula R'—COOR", wherein R' is selected from the group consisting of hydrogen and an alkyl group containing from 1 to 3 carbon atoms, and wherein R" is selected from the group consisting of an alkyl group containing from 2 to 7 carbon atoms and a cycloalkyl group, and wherein said ester contains a total of 6 to 8 carbon atoms, at a temperature between 90 and 160° C., and recovering the resultant product.

2. A process according to claim 1 wherein said ester is n-butyl acetate.

3. A process according to claim 1 wherein said ester is isoamyl acetate.

4. A process for the preparation of tolylene diisocyanate which comprises:
   (I) reacting toluene diamine with a stoichiometric excess of anhydrous hydrogen chloride in an inert organic ester medium, said ester having the structural formula R'—COOR", wherein R' is selected from the group consisting of hydrogen and an alkyl group containing from 1 to 3 carbon atoms, and wherein R" is selected from the group consisting of an alkyl group containing from 2 to 7 carbon atoms and a cycloalkyl group and where said ester contains a total of 6 to 8 carbon atoms, at a temperature of below about 100° C. to form the hydrochloride salt;
   (II) phosgenating the resultant reaction mixture with a stoichiometric excess of phosgene at a temperature between 90 to 160° C., and
   (III) recovering the resultant product.

5. A process according to claim 4 wherein said ester is n-butyl acetate.

6. A process according to claim 4 wherein said ester is isoamyl acetate.

References Cited in the file of this patent
UNITED STATES PATENTS

| 2,619,503 | Benner et al. | Nov. 25, 1952 |
| 2,911,429 | Bloom et al. | Nov. 3, 1959 |
| 2,963,504 | Thelin et al. | Dec. 6, 1960 |
| 2,976,320 | Winstrom et al. | Mar. 21, 1961 |
| 3,014,942 | Vaganay et al. | Dec. 26, 1961 |